United States Patent [19]

Mott

[11] 4,095,741
[45] Jun. 20, 1978

[54] PROPORTIONAL ELECTRICAL CONTROL SYSTEM

[75] Inventor: Richard C. Mott, Harwood Heights, Ill.

[73] Assignee: Honeywell Inc., Minneapolis, Minn.

[21] Appl. No.: 649,117

[22] Filed: Jan. 14, 1976

[51] Int. Cl.² .......................................... G05D 23/275
[52] U.S. Cl. .................................. 236/78 C; 236/84; 251/131
[58] Field of Search .................. 236/78 C, 87, 101 E, 236/101 D, 75, 79, 82, 84, 78 D, 98; 91/365, 388, 403; 251/131; 318/371, 372, 373; 73/368 H, 368.3

[56] References Cited

U.S. PATENT DOCUMENTS

| | | | |
|---|---|---|---|
| 416,947 | 12/1889 | Powers | 236/98 X |
| 1,605,299 | 11/1926 | Sweatt et al. | 236/78 C |
| 1,943,267 | 1/1934 | De Giers | 73/407 |
| 1,962,324 | 6/1934 | Noble | 73/407 X |
| 2,112,682 | 3/1938 | Ryder | 236/78 C |
| 2,132,338 | 10/1938 | Zieboltz | 236/79 |
| 2,208,753 | 7/1940 | Edmondson | 236/78 C |
| 2,317,028 | 4/1943 | Chappell et al. | 73/494 |
| 2,507,606 | 5/1950 | McLeod | 73/407 R |
| 2,530,157 | 11/1950 | Eckman | 236/78 D |
| 2,592,088 | 4/1952 | Wannamaker, Jr. et al | 236/78 C X |
| 3,087,471 | 4/1963 | Ray | 236/82 |
| 3,373,935 | 3/1968 | Thorburn | 236/82 |
| 3,393,607 | 7/1968 | Peczowski et al. | 91/388 |

*Primary Examiner*—William E. Wayner
*Attorney, Agent, or Firm*—Trevor B. Joike

[57] ABSTRACT

A control system for proportionally operating an actuator is disclosed having a condition responsive device comprising an element movable in response to a sensed condition and a sensing device for sensing the movement of the element, the actuating means being connected to the sensing device for movement in response to the movement of the sensing element and a feedback mechanism responsive to the movement of the motor for repositioning the sensing device and the sensing element relative to one another for providing proportional control.

2 Claims, 1 Drawing Figure

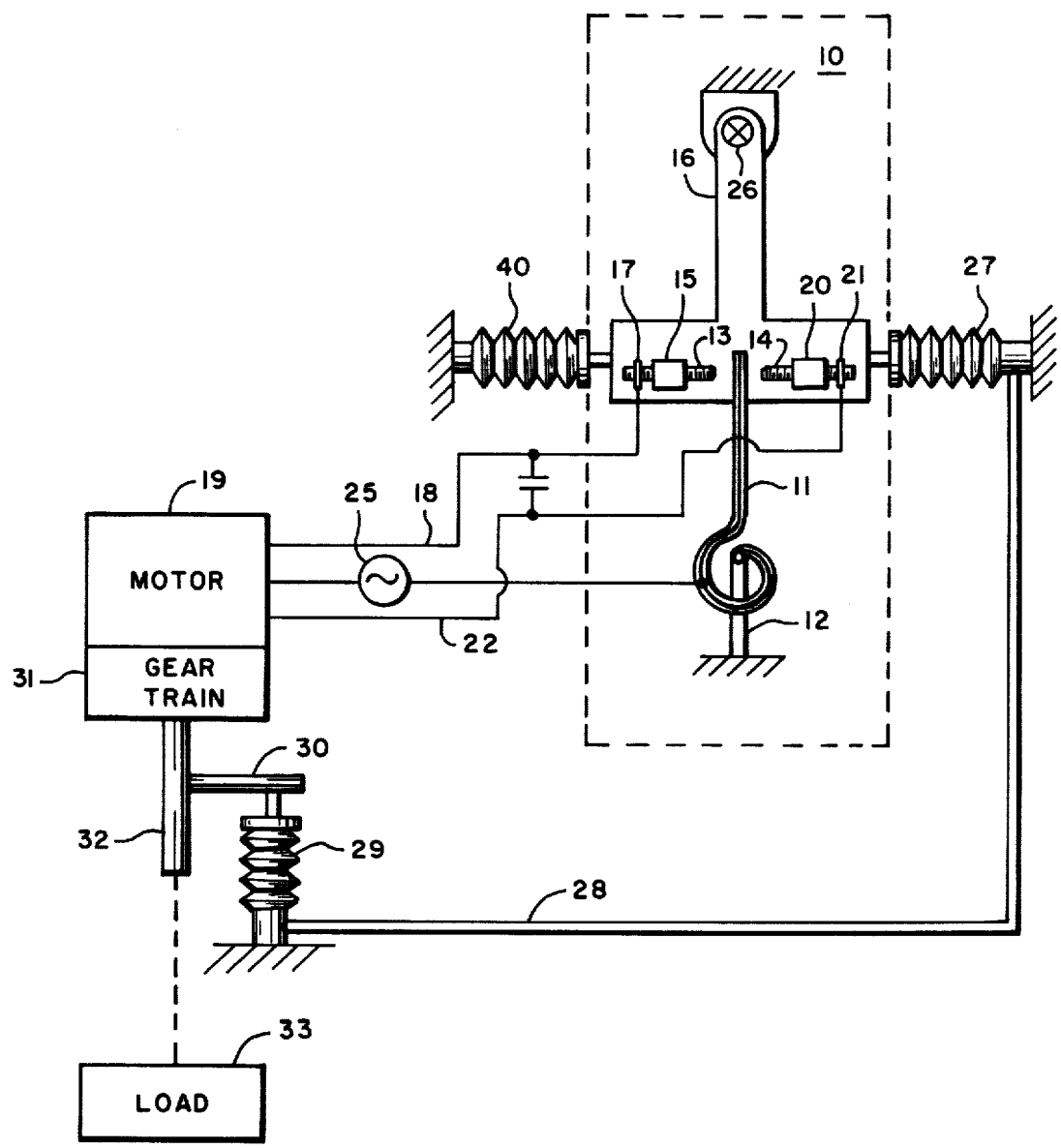

PROPORTIONAL ELECTRICAL CONTROL SYSTEM

The present system relates to proportional control systems and, more particularly, to systems for balancing the movement of a condition responsive device dependent upon the movement of an output actuating means.

BACKGROUND OF THE INVENTION

In the control of various conditions, such as temperature, various control systems have been provided. For example, temperature controlling valves driven by a motor controlled by a thermostat have been employed to control the temperature of a space. These systems, however, have been on-off systems in the sense that the motors either drove the valves fully opened or fully closed. In such systems, the condition or temperature responsive device operated between an off position and an on position. The distance between the off and on positions is termed the "differential" of the control system. Because these on-off systems operated within a differential, the actual temperature of the controlled environment tended to oscillate around the control or set point. To eliminate this cycling, the prior art developed the proportional control system.

To make the prior art motor driven or actuator driven on-off systems proportional, a rebalancing resistor connected into a bridge circuit with the condition responsive device and operated by the motor or actuating means was included. Thus, when the condition responsive means sensed a change in condition away from a control point, the motor or actuator would move a control element such as a valve a distance until the balancing resistor balanced the condition responsive means. This distance is then proportional to the condition responsive means, i.e. the deviation of the actual sensed condition from the set point. These prior art proportional systems, however, tend to be complicated and expensive.

SUMMARY OF THE INVENTION

Applicant has provided a simple mechanism for providing proportional control of a condition control system. An actuator, which may be a motor, is provided for driving a movable output, a condition responsive means having a movable element and a sensing means is provided for sensing a condition, connecting means are provided for connecting the sensing means to the actuating means and a feedback means is responsive to the movement of the movable output of said actuating means for repositioning the sensing means and the sensing element relative to one another for providing proportional control.

BRIEF DESCRIPTION OF THE DRAWING

These and other features and advantages of the invention will become apparent from a detailed description of the drawings in which the sole FIGURE shows the schematic view of the instant invention.

DETAILED DESCRIPTION OF THE INVENTION

A condition responsive device, which may be a thermostat, 10 has movable element or bi-metal 11 having one end fixed to support 12 and the other end movable between contacts 13 and 14 of a sensing means. Contact 13 is threaded through a flange 15 of support 16. A contact 17 is connected to the contact 13 and connects to line 18 which is connected to one terminal of reversible motor 19. The contact 14 is threaded through flange 20 of support 16 and contact 21 is connected to the contact 14 and to one end of line 22 the other end of which is connected to another terminal of motor 19. The third terminal of reversible motor 19 is connected to one side of source 25 the other side of which is connected to the bi-metallic element 11.

The support 16 is movable by a bellows 27 around pivot point 26. The bellows 27 is supplied with air by a pneumatic tube 28 from a bellows 29. The bellows 29 is contracted and expanded by an arm 30 of the output shaft of the motor 19 and gear train 31 assembly. The output shaft 32 drives a load 33 which may be a condition changing load such as a temperature medium controlling valve. To provide for ambient pressure compensation, another bellows 40 is connected to the other side of the support 16 and expands and contracts dependent upon the changes in ambient pressure.

Assuming that the condition responsive device 10 is a thermostat and the load 33 is a condition controlling valve, upon a decrease in temperature, the bi-metal 11 moves against the contact 13 which operates the motor to drive the valve or load 33 towards a closed position. As member 30 collapses the bellows 29, the air trapped within pneumatic tube 28 causes bellows 27 to expand and move the support 16 in a clockwise direction about pivot 26 to disengage the contact 13 and the bi-metal 11. The motor stops operation and has operated the valve 33 to a position proportional to the movement of the bi-metal 11 in response to the decreased temperature.

If the temperature sensed by the device 10 increases, the bi-metal 11 moves against the contact 14 to operate the motor 19 to open the valve 33. As the member 30 moves upward, it expands the bellows 29 which tends to collapse the bellows 27 to move the support 16 in a counter-clockwise direction to open the contact 14 and bi-metal 11. Again, the amount of movement of the output shaft 32 of the motor 19, gear train 31 arrangement is proportional to the amount of movement of the bi-metal 11 in response to the sensed condition. Specifically, the higher the sensed temperature, the greater the movement of bi-metal 11 and the greater the movement of support 16 to break the contact between contact 14 and bi-metal 11 in response to the greater movement of the output shaft 32.

The movement of the shaft 32 may be rotary as well as linear and, as in a typical thermostat, the set point may be provided by making the support 12 adjustable. These and other changes may be made without departing from the scope of the invention which is to be limited only by the appended claims.

The embodiments of the invention in which an exclusive property or right is claimed are defined as follows:

1. A proportional control system comprising:
   bi-directional actuating means having a movable output adapted to change the position of a condition controlling device;
   condition responsive means comprising a temperature responsive bi-metal element fixedly secured at one end and movable at another end in response to temperature, and first and second contacts fixedly secured to a support wherein said first contact is engaged by said bi-metal element when said bi-metal element moves in a first direction and said second contact is engaged by said bi-metal element when said bi-metal element moves in a second direction;

connecting means for connecting first and second contacts and said bi-metal element to said bi-directional actuating means wherein said bi-directional actuating means moves said movable output in a first direction when said bi-metal element engages said first contact and moves said movable output in a second direction when said bi-metal element engages said second contact; and, feedback means comprising a trapped air system having a first bellows operated by said actuating means, a second bellows connected to said support and a pneumatic tube connecting said first and second bellows together wherein movement of said movable output by said bi-directional actuating means causes said support to be repositioned in a direction to disengage said bi-metal element from said first and second contacts to provide proportional control.

2. The system of claim 1 wherein a third bellows is connected to said support for ambient pressure compensation.

* * * * *